United States Patent [19]
Watanabe et al.

[11] Patent Number: 6,157,027
[45] Date of Patent: Dec. 5, 2000

[54] MODULAR OPTICAL FIBER COLOR IMAGE SCANNER WITH ALL-OPTICAL SCANNER HEAD HAVING SIDE-COUPLED LIGHT GUIDE FOR PROVIDING ILLUMINATION LIGHT TO THE SCANNER HEAD

[75] Inventors: Kojiro Watanabe, Cranbury; Ting Wang, Princeton, both of N.J.

[73] Assignee: NEC USA, Inc., Princeton, N.J.

[21] Appl. No.: 09/201,803

[22] Filed: Dec. 1, 1998

[51] Int. Cl.[7] .................................. H01J 3/14; G02B 6/26
[52] U.S. Cl. ...................... 250/234; 250/227.24; 385/116
[58] Field of Search ..................................... 250/234, 566, 250/227.11, 227.2, 287.24; 385/115, 116, 120, 31, 39, 484; 235/462.01, 472.01

[56] References Cited

U.S. PATENT DOCUMENTS

| | | |
|---|---|---|
| 3,610,891 | 10/1971 | Raciazek . |
| 3,711,723 | 1/1973 | McMurtry . |
| 3,784,794 | 1/1974 | Allais . |
| 3,786,181 | 1/1974 | Pear, Jr. . |
| 3,869,599 | 3/1975 | Sansone . |
| 3,870,396 | 3/1975 | Racki et al. . |
| 4,011,007 | 3/1977 | Phaneuf et al. . |
| 4,467,196 | 8/1984 | Balliet et al. . |
| 4,702,552 | 10/1987 | Margolin . |
| 4,748,680 | 5/1988 | Margolin . |
| 4,760,421 | 7/1988 | Margolin . |
| 4,847,490 | 7/1989 | Nishikama . |
| 4,978,850 | 12/1990 | Nakamura et al. . |
| 5,015,064 | 5/1991 | Detig et al. . |
| 5,061,036 | 10/1991 | Gordon . |
| 5,074,641 | 12/1991 | Nakai et al. . |
| 5,121,459 | 6/1992 | Chiang . |
| 5,159,656 | 10/1992 | Goldstein . |
| 5,258,858 | 11/1993 | Chow . |
| 5,367,596 | 11/1994 | Chow . |
| 5,673,344 | 9/1997 | Li et al. . |
| 6,075,240 | 7/2000 | Watanabe et al. ...................... 250/234 |

OTHER PUBLICATIONS

Abstract: "Development of a pen-shaped scanner and its applications", Ichiro Fujieda, et al.
Compact Imaging Apparatus for a Pen-Shaped Hand-Held Scanner, by Haga, Fujieda and Okumura, in Proceedings of the SPIE, International Society for Optical Engineering, vol. 3019, pp. 168–173, Feb. 1997.

Primary Examiner—Seungsook Ham
Assistant Examiner—Kevin Pyo
Attorney, Agent, or Firm—Sughrue, Mion, Zinn, Macpeak & Seas, PLLC

[57] ABSTRACT

A scanner has an optical-electric module, an incoherent fiber bundle, and a scanner head. The incoherent fiber bundle has illumination fibers and pickup fibers. The illumination fibers carry only illumination light from a light source in the O/E module toward the scanner head. The pickup fibers carry sensed light from the scanner head to a CCD array in the O/E module. The scanner head has a light guide that receives the illumination light from the illumination fibers. The light guide is in contact with the pickup fibers in an arrangement which permits the illumination light to enter the side of the illumination fibers near the end. Illumination light reflected back into the pickup fibers is guided to the CCD array.

5 Claims, 12 Drawing Sheets

MODULAR OPTICAL FIBER COLOR IMAGE SCANNER WITH ALL-OPTICAL SCANNER HEAD HAVING SIDE-COUPLED LIGHT GUIDE FOR PROVIDING ILLUMINATION LIGHT TO THE SCANNER HEAD

RELATED APPLICATIONS

This application is related to application Ser. No. 09/124,832, which is incorporated herein by reference for all purposes.

BACKGROUND OF THE INVENTION

1. Field of the Invention

This invention relates to a scanner with an optical-electric module (O/E), an incoherent fiber bundle, and a scanner head connected to the O/E module by the incoherent fiber bundle. More particularly, the scanner according to the invention includes, in one embodiment, illumination fibers carrying only illumination light from the O/E module to the scanner head, and pickup fibers carrying only sensed light from the said scanner head to the O/E module.

2. Related Art

A scanner is a device, which is useful for picking up images in a form readable by computers. Although desktop scanners are useful for picking up images, they are impractical for use with portable computers. Hand-held scanners have been developed to fulfill the need for portable computer users to scan images.

Hand-held scanners must ideally be easy to use, easy to install, lightweight, sturdy, rugged, accurate, reliable, and inexpensive. One design for a hand-held scanner is the pen-shaped design. In this design, the scanner is roughly the shape of a pen. This type of hand-held scanner is dragged across a pickup area on its side. The image in the pickup area is picked up, or sensed, and is provided to the computer.

One example of a pen-shaped hand-held optical fiber scanner is reported in "Compact Imaging Apparatus for a Pen-Shaped Hand-Held Scanner", Proceedings of the SPIE, Int'l Society for Optical Engineering, Vol. 3019, pp. 168–173, February 1997. One drawback of this design of scanner is that electrical components are included in the scanner head (i.e., the pen). Because the scanner head is hand-held, it is subject to being dropped and jarred.

To improve the resistance of a hand-held scanner to being dropped and jarred, different approaches are possible. One excellent approach is to remove the electronic components from the scanner head as in patent application Ser. No. 09/124,832, mentioned above.

According to this approach, a scanner has an O/E module connected to a scanning head by an incoherent fiber bundle. The scanning head is all-optical, and is free of electronic components. The O/E module introduces source RGB light into the fibers, and also permits the sensed light to be provided to a CCD. The fibers in the incoherent fiber bundle are unidirectional in that they either carry illumination light from the O/E to the scanner head or sensed light from the scanner head to the O/E module. The O/E module is the module of the scanner with the electronic elements. Because the electronic components are on the O/E module, separate from the scanner head, the scanner head is lighter in weight and less susceptible to damage from being dropped or jarred. Moreover, the O/E module may be miniaturized and integrated into a computer motherboard or a PC card device meeting, e.g., the Personal Computer Memory Card International Association (PCMCIA) standard.

The scanner according to application Ser. No. 09/124,832 provides that the RGB light enters the fibers of the incoherent fiber bundle using a side-coupling approach in the O/E module. That is, the RGB source light is fed into a linear light guide, such as a fiber, which is coupled to the fibers in the incoherent fiber bundle in the O/E module. More particularly, the RGB light is coupled into a fiber of the incoherent fiber bundle through a notch which is made in the fiber.

One shortcoming of the side-coupling approach in the foregoing scanner is that a notch must be made in the fibers of the incoherent fiber bundle so as to couple them with the source light. The making of this notch is not a trivial task, and it would be an important improvement to provide a hand-held pen-shaped scanner with all of the advantages of the scanner just described, but without the drawback of a physical alteration to the fibers.

SUMMARY OF THE INVENTION

It is an objective of the invention to provide a pen-shaped, hand-held scanner having an all-optical scanning head, an incoherent fiber bundle, and an O/E module, in which the fibers are not physically altered to introduce source light.

By providing such a scanner, manufacturing may be simplified, thus giving the benefits of light weight and ruggedness at a reduced cost.

This objective is achieved by a scanner having an optical-electric module, an incoherent fiber bundle, and a scanner head. The incoherent fiber bundle has illumination fibers and pickup fibers. The illumination fibers carry only illumination light from a light source in the O/E module toward the scanner head. The pickup fibers carry sensed light from the scanner head to a CCD array in the O/E module. Thus, the fibers in the incoherent fiber bundle are substantially unidirectional.

The scanner head has a light guide that receives the illumination light from the illumination fibers. The light guide is in contact with the pickup fibers in an arrangement which permits the illumination light to enter the side of the illumination fibers near the end. The illumination light goes out the end of the pickup fibers and reflects off the target (i.e., the image). The light reflected back into the pickup fibers, known as sensed light, is guided to the CCD array.

The invention will be better understood from the following description in which an exemplary embodiment is described in detail with the aid of the accompanying figures. It is to be understood that the described embodiment is merely an example of the realization of the invention and is for explanation only. In other words, the invention is not to be construed to be limited in its applicability to this one example.

DETAILED DESCRIPTION OF THE PREFERRED EMBODIMENT

Figure 1:
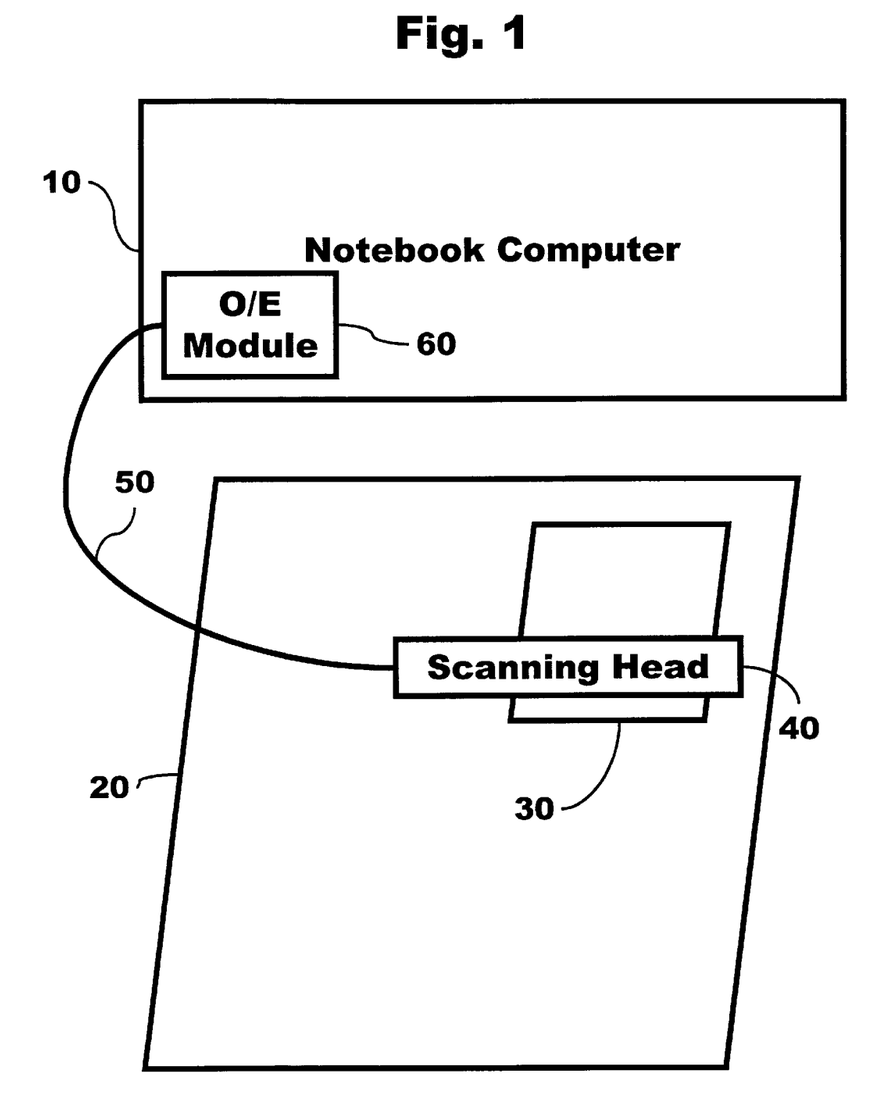
FIG. 1 shows, in simplified schematic form, how a pen-shaped and-held scanner may be used.

In FIG. 1, a user has a notebook computer 10 or the like. Although any computer would work, the use of a pen-shaped hand-held scanner is particularly advantageous with a notebook computer 10. Reference numeral 20 indicates a media surface, such as a piece of paper, cardboard, or the like. Reference numeral 30 indicates a particular surface to be scanned. The surface to be scanned will be referred to as a target 30.

The scanner according to the invention has a scanning head 40. Scanning head 40 may be of any width; in the preferred embodiment, the effective scanning area is conveniently 10 cm.

It will be appreciated that the target 30 may be wider or narrower than the width of scanning head 40. When the target 30 is wider than scanning head 40, multiple scans will be necessary to acquire the entire target. When the target 30 is narrow than scanning head 40, some additional information will be picked up and will need to be discarded.

It will be further appreciated that the invention applies to scanning anything, not just paper. In other words, target 30 could also be a fingertip and the picked-up image might be a fingerprint. For simplicity, however, it will be assumed that a paper of some sort is the surface to be scanned.

The scanning head 40 is connected to an incoherent fiber bundle 50. The incoherent fiber bundle 50 is connected to an O/E module 60. Preferably, the connection between fiber bundle 50 and O/E module 60 is such that the incoherent fiber bundle 50 can easily be replaced if inoperable. Likewise, the O/E module 60 could conveniently be replaced.

The O/E module 60 is preferably part of the motherboard of notebook computer 10 or, equally preferable, is included in a PCMCIA card which may be easily engaged in a PCMCIA slot of notebook computer 10.

Figure 2:
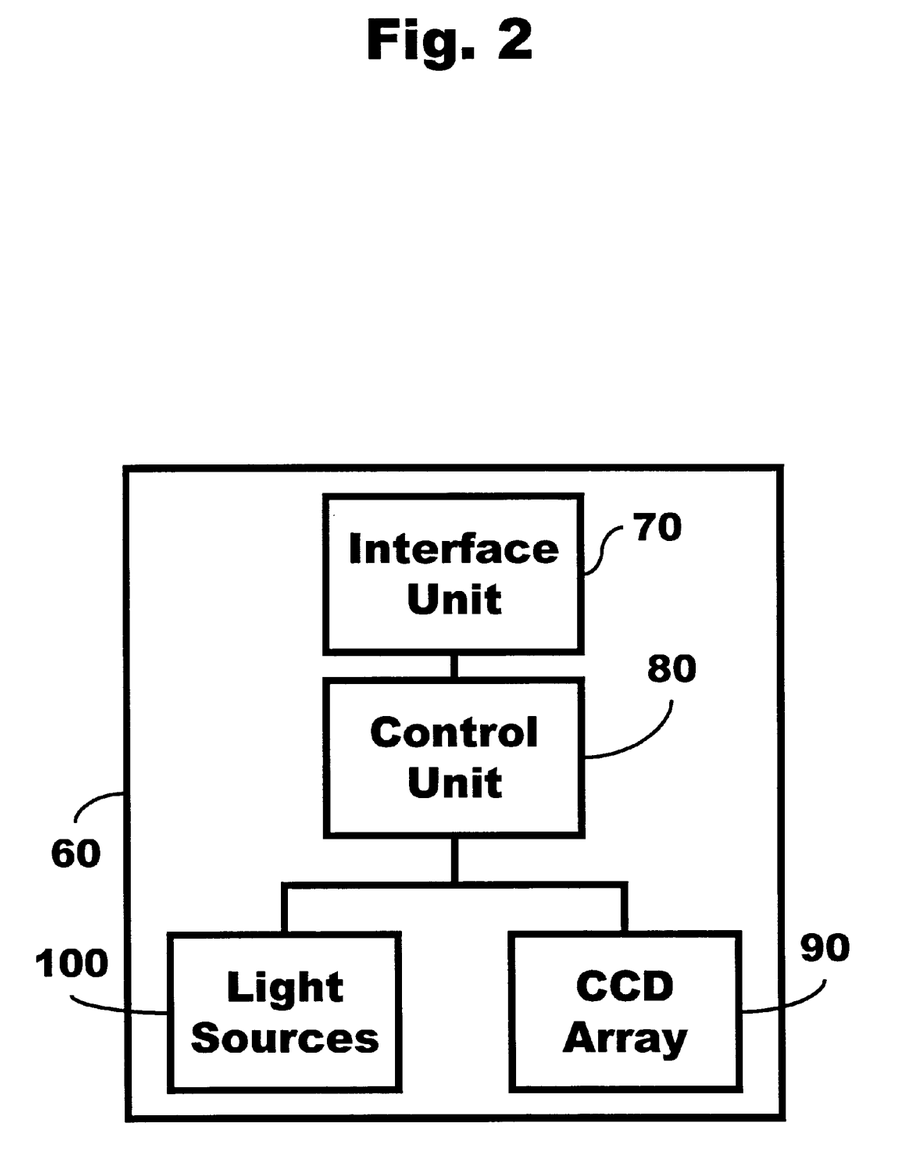
FIG. 2 shows, in simplified schematic form, the key components of an O/E module according to the invention.

In FIG. 2, the key components of O/E module 60 are shown in a highly simplified, schematic form. In particular, reference numeral 70 indicates an interface unit; reference numeral 80 indicates a control unit; reference numeral 90 indicates a CCD unit; and reference numeral 100 indicates a light source.

FIG. 2 shows an exemplary embodiment of the O/E module 60 in which the O/E module 60 is implemented in a PCMCIA card. Interface unit 70 interfaces with the notebook computer 10 according to the well-known PCMCIA standard. Control unit 80 controls the interface unit 70, the light source 100, and the CCD unit 90. Control unit 80 drives the O/E module 60 in a manner substantially the same as in application Ser. No. 09/124,832. Since the driving method of the pen-shaped hand-held scanner is not the focus of this invention, further mention of it is omitted.

The light source 100 provides red (R), green (G), and blue (B) light, preferably using one or more LED's. The LED's are illuminated in a time-sharing manner so that, at any one time, only one color of light is output by light source 100.

The CCD unit 90 receives sensed light and, in accordance with the driving method of application Ser. No. 09/123,832, provides corresponding signals to the notebook computer 10 via interface unit 70.

Figure 3A:
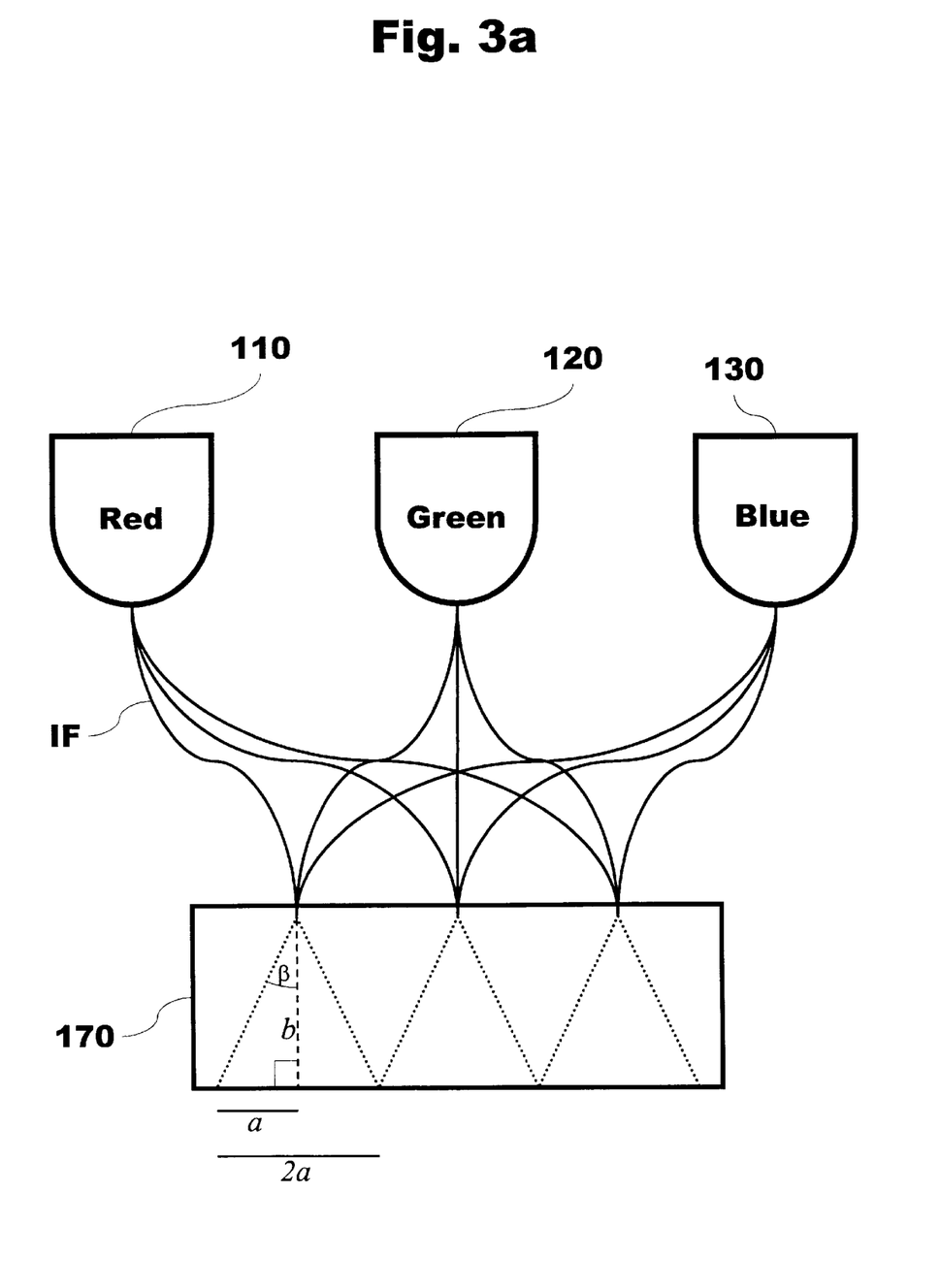
FIG. 3a shows a simplified schematic view of light provided from a light source unit with three LEDs, through illumination fibers, to a light guide.

FIG. 3a shows how light from light source 100 is provided to a light guide 170. In FIG. 3, reference numeral 110 indicates a red LED; reference numeral 120 indicates a green LED; reference numeral 130 indicates a blue LED; and reference symbol IF indicates illumination fibers. The LED's are activated in time division manner so that light guide 170 is provided with only one color of light at a time. These three lights, collectively, may be referred to as RGB light. Thus, the light source 100 of O/E module 60 provides RGB light to light guide 170. Light source 100 is preferably provided with a receptacle so as to receive a connector from fiber bundle 50, for easy replacement of the fiber bundle 50.

Figure 3B:
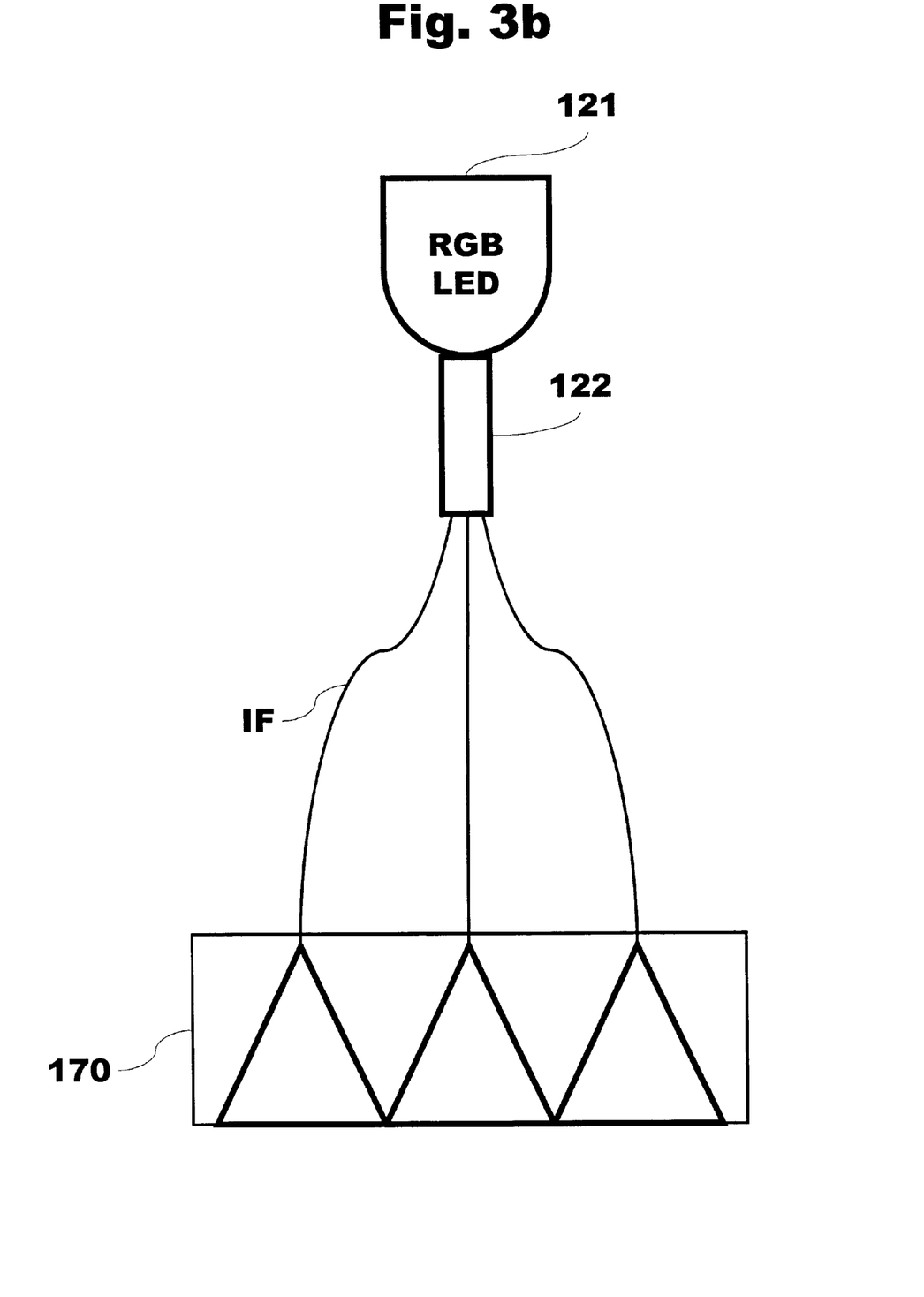
FIG. 3b shows a simplified schematic view of light provided from a light source unit with only one LED, through illumination fibers, to a light guide.

FIG. 3b shows an alternative embodiment. In FIG. 3b, a single RGB LED 121 is used. This type of LED is available from NICHIA CHEMICAL INDUSTRIAL, LTD. (part number NSCM310), but is significantly more expensive than the single color LEDs. The light from RGB LED 121 is provided into mixing rod 122, and delivered to the light guide 170 via the illumination fibers IF. This embodiment has the advantage of fewer and simpler connections.

It is important to provide sufficient light intensity at the scanning target 30 for proper illumination of the target. The required degree of light intensity will depend on the sensitivity of the CCD array and other factors well known to those familiar with this field.

As will be readily appreciated, the intensity of light provided on the scanning target 30 is a function of several factors, some of which are the intensity of the RGB source light, the number of illumination fibers, and the length of the light guide. In particular, the further the light must travel once it enters the light guide and begins to spread out, the lower the intensity at the scanning target.

It also is important to provide for complete coverage of the effective scanning area. Complete coverage means ensuring that the fibers are close enough together so that all of the end of the light guide 170 at the coupling area is supplied with illumination light.

To explain further, the light coming out of each of the illumination fibers IF has an illumination area. That is, the light entering the light guide begins to spread out at least widthwise along the light guide 170. The illumination area provided by the light from the illumination fibers in FIGS. 3a and 3b is represented by a triangular shape within light guide 170. Three illumination fibers are depicted, and they are positioned so as to provide illumination along the entire end of the light guide 170 in the coupling area.

The illumination fiber's numerical aperture affects the angle at which the illumination light exits the illumination fiber. The light spreads widthwise in a manner which may be thought of as a generally triangular shape (see FIG. 3a). In particular, the numerical aperture of an illumination fiber is $NA_{IF}$. Light may exit the illumination fiber perfectly straight (i.e., an angle of 0° with respect to the axis of the fiber). Light may exit the illumination fiber at an angle. Because of the numerical aperture of the illumination fiber, however, the maximum exit (launch) angle with respect to the axis of the fiber is $\beta=\sin^{-1}(NA_{IF})$ (assuming no Snell's law effect). Using trigonometry, and knowing the length b of the light guide 170, it is not difficult to determine the width 2a of the illumination area at any given distance from the beginning of the light guide 170.

Thus, the requirements for sufficient illumination intensity and complete coverage in the coupling area must be kept in mind. In so doing, it is possible to provide a scanner having an appropriate number of illumination fibers carrying sufficient RGB illumination light, coupled with the light guide 170 at a spacing that gives the necessary coverage, and with a light guide 170 having a length that provides the necessary intensity at the scanning target.

Figure 4A:
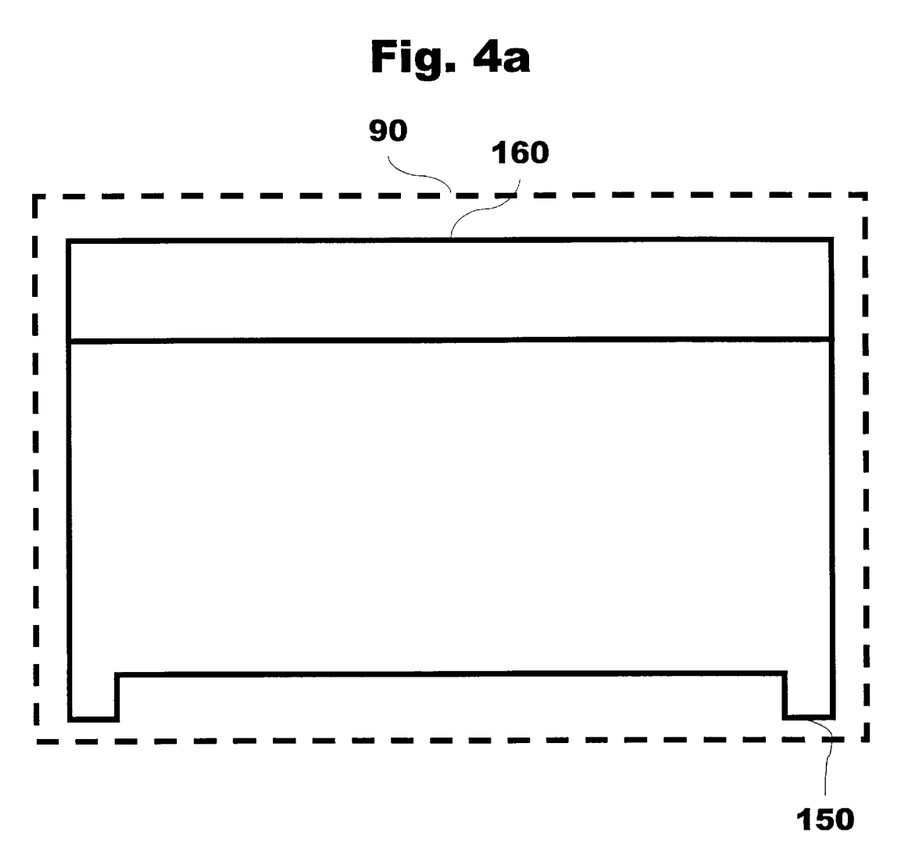
FIG. 4a shows a simplified schematic view of a CCD unit.
Figure 4B:
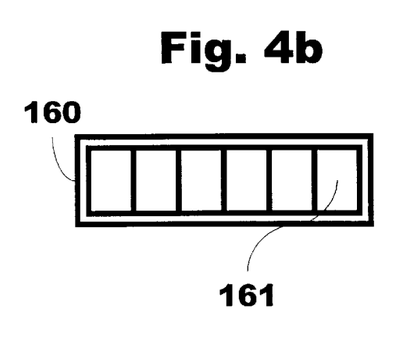
FIG. 4b shows a simplified schematic view of a linear CCD array.
Figure 4C:
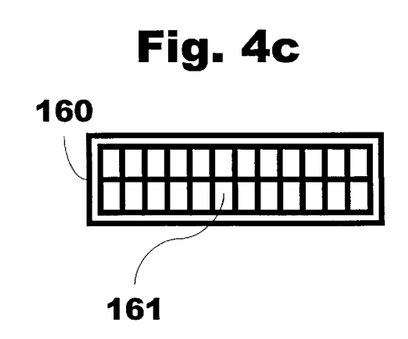
FIG. 4c shows a simplified schematic view of a two-dimensional CCD array.

FIG. 4a shows CCD unit 90 in more detail. In FIG. 4, reference numeral 150 indicates a receptacle and reference numeral 160 indicates a CCD array. As shown in FIG. 4b, the CCD array 160 may include detectors 161 in a liner arrangement. Alternatively, as shown in FIG. 4c, the CCD array may include detectors 161 in a 2-dimensional arrangement. Receptacle 150 is adapted to receive an appropriately shaped connector for placing pickup fibers in an operational relation to the sensors of the CCD array 160. That is, light carried by fibers attached to the connector proceeds through the receptacle 150 and is picked up by the sensors of the CCD array 160. To put it another way, sensed light is picked up by CCD array 160 through receptacle 150. CCD arrays such as those just described are available, for example, from TEXAS INSTRUMENTS.

It will be appreciated that there is no specific requirement for two different receptacles; the receptacle of light source 100 and the receptacle 150 of CCD unit 90 could be configured so that only one receptacle is used to accommodate and properly to route the fibers.

Between the fiber bundle and the CCD is a gel (not shown) for index matching.

Figure 5:
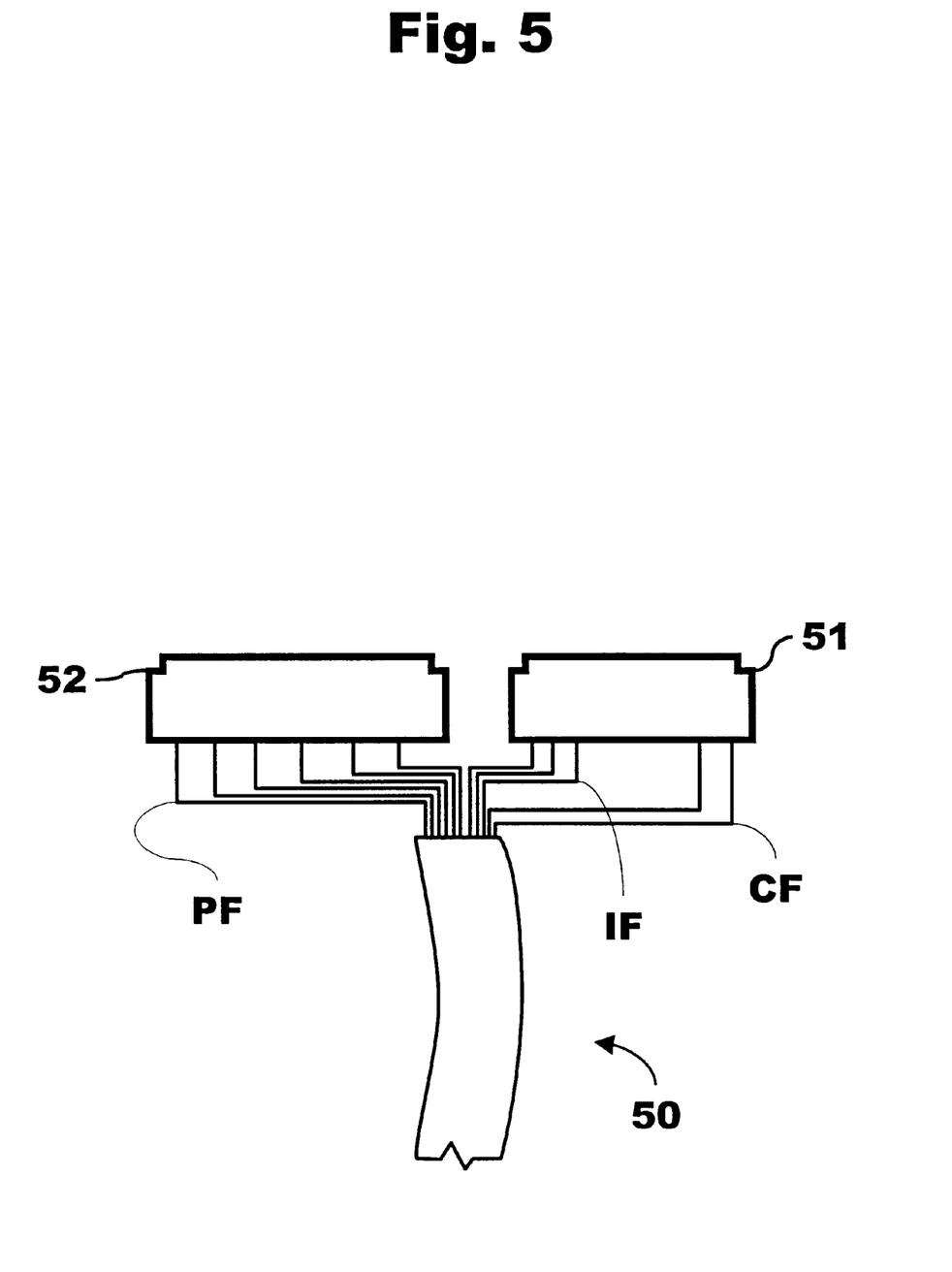
FIG. 5 shows a simplified schematic view of a part of an incoherent fiber bundle.

FIG. 5 shows an example of the part of fiber bundle 50 that connects to the O/E module 60. Fiber bundle 50 may include a connector 51 for connecting illuminating fibers IF and control fibers CF to the receptacle of light source 100, and a connector 52 for connecting pickup fibers PF to receptacle 150 of CCD unit 90. The output of the control fibers CF may be provided to control unit 80 for processing.

Incoherent fiber bundle So is flexible and long enough to conveniently scan target 30 into computer 10. A useful length for incoherent fiber bundle 50 is 2 meters. The receptacles and connectors may be configured in a myriad of different ways, including having all fibers at each end terminating in a single connector which connects to a single receptacle. The receptacles and connectors are not actually necessary at all, and the scanning system of the invention may be used with the fibers directly connected between the scanning head 40 and the O/E module 60. The utility in the receptacles and connectors lies in the ease of changing parts should one component become inoperative.

Figure 6:
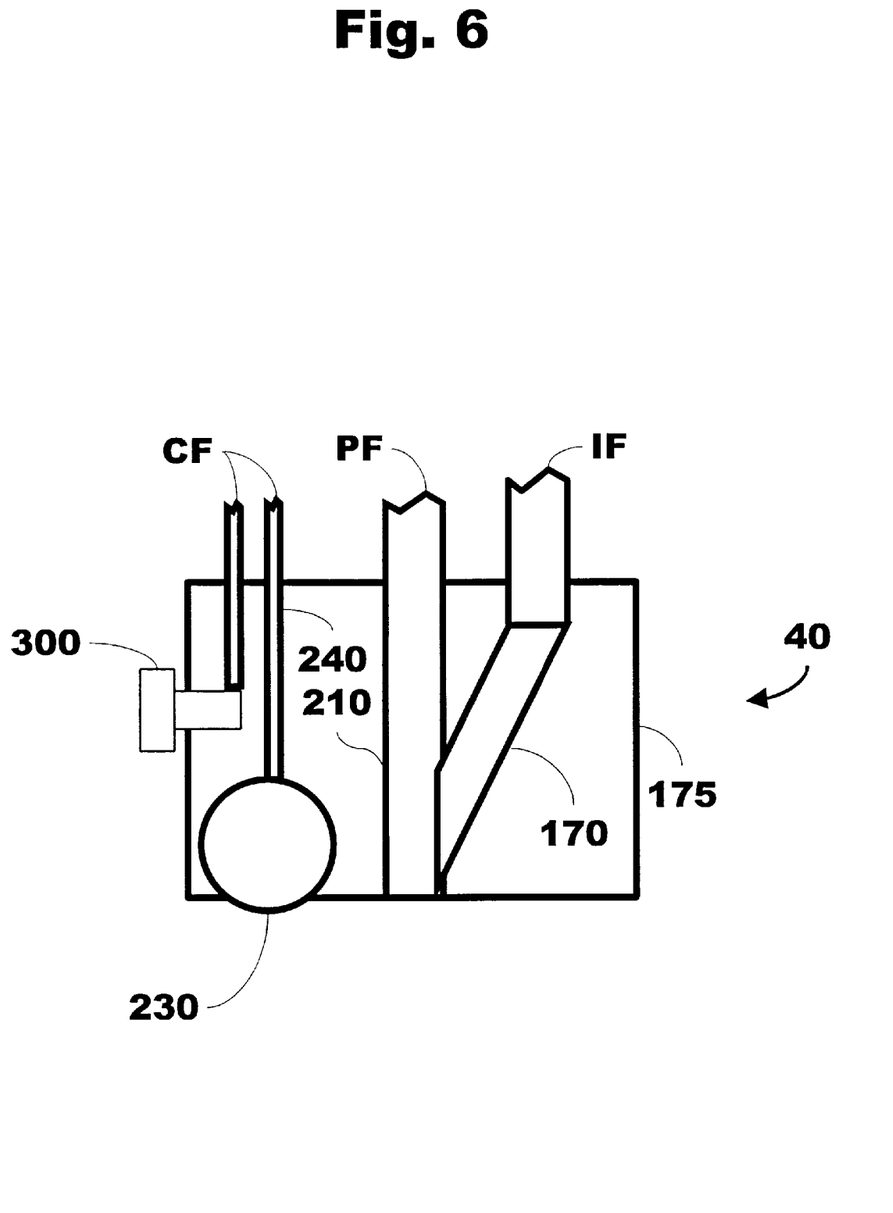
FIG. 6 shows a simplified schematic view of a scanner head.

FIG. 6 shows a simplified schematic view of scanning head 40. Reference numeral 175 indicates a scanning head body. The scanning head body 175 has spaces shaped to accommodate the components it houses. The scanning head body 175 may be produced using plastic injection molding. A light guide 170 is provided in one such appropriately-shaped space of scanning head body 175. The light guide 170 connects to the illumination fibers IF. The light guide 170 is described in more detail below.

Scanning head 40 further includes pickup fiber ends 210. Pickup fiber ends 210 are the ends of the pickup fibers PF.

Scanning head 40 further includes a roller 230, a fiber encoder 240, and a control switch 300. The fiber encoder 230 and control switch 300 are operably disposed with respect to control fibers CF. Other control fibers necessary for controlling scanning head 40 may be provided, but are not shown so as to avoid obscuring the invention. The control of scanning head 40 in accordance with roller 230, fiber encoder 240, control switch 300, and other control means may be performed as mentioned in related application Ser. No. 09/124,832.

Figure 7:
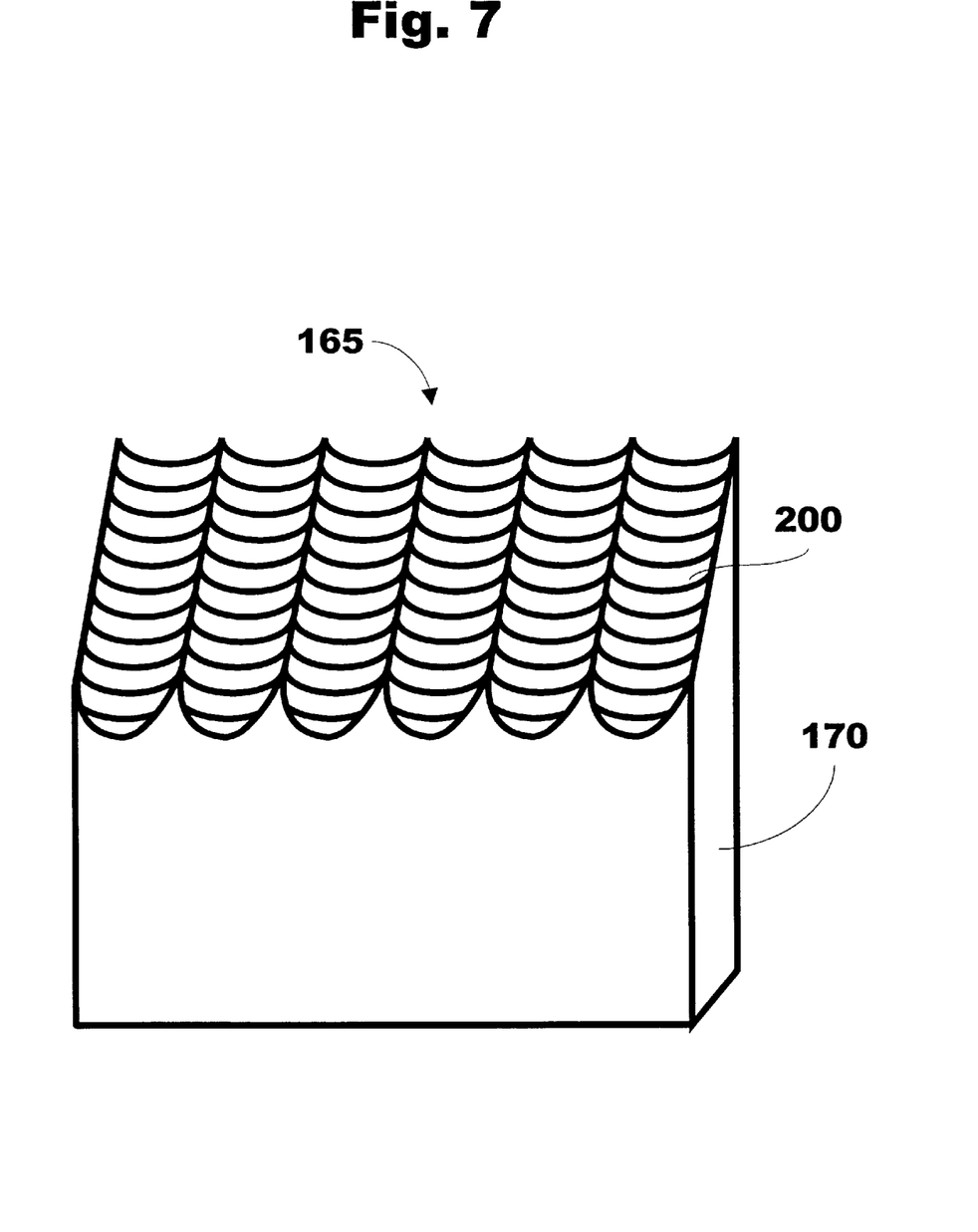
FIG. 7 shows a simplified plan view of a light guide.

The light guide unit will now be described in more detail in conjunction with FIG. 7, in which reference numeral 170 identifies an already-mentioned light guide. The illumination fibers IF that receive the RGB light from light source 100 are connected to the light guide 170. The light guide 170 is designed so that the RGB light is evenly distributed along a forward edge 165 of the light guide 170.

Figure 8:
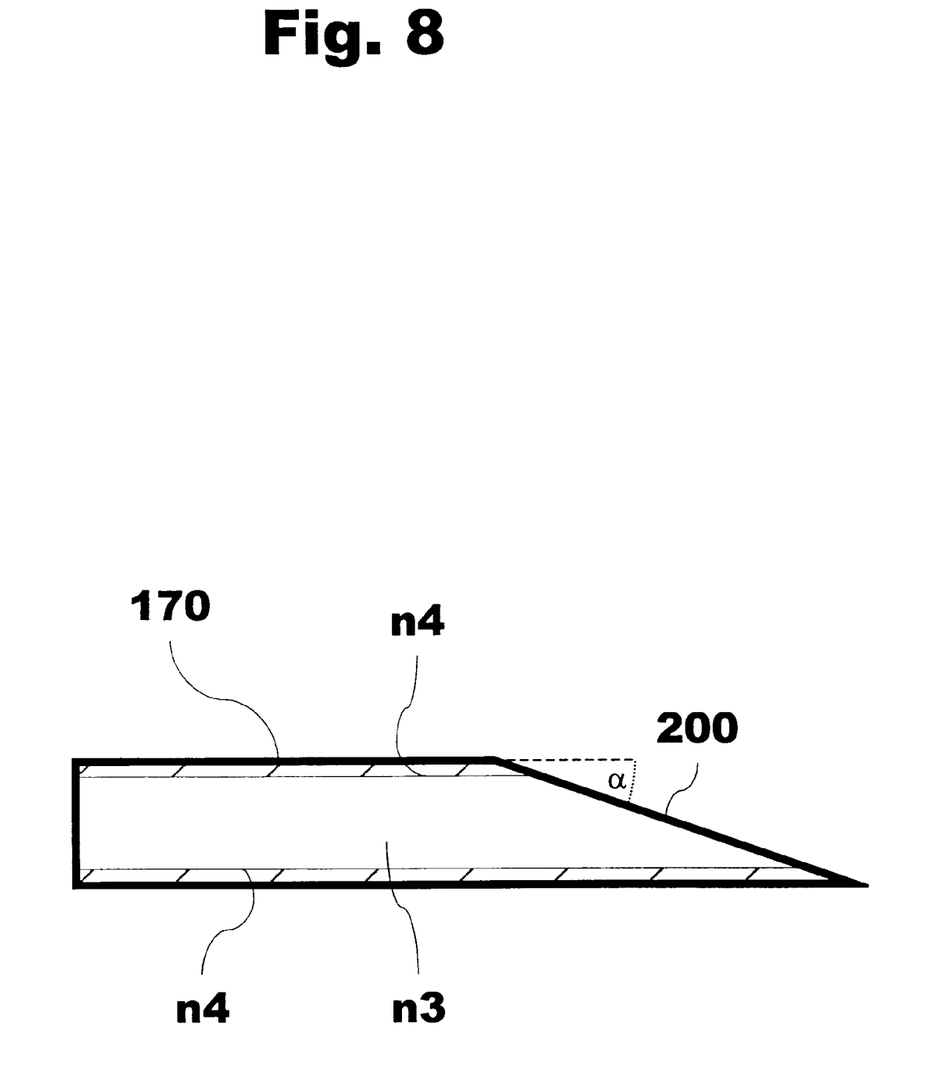
FIG. 8 shows a simplified schematic cross-sectional view of a light guide.

Light guide 170 has a tapered portion 200. The tapered portion 200 is angled and has rounded grooves for accommodating pickup fiber ends 210. FIG. 8 shows, from the side, light guide 170. Tapered portion 200 of light guide 170 is angled at an angle of inclination designated by reference symbol a. The light guide 170 is generally made up of a material having a refractive index of n3, but is coated with a material having a refractive index of n4 which is lower than n3.

Figure 9:
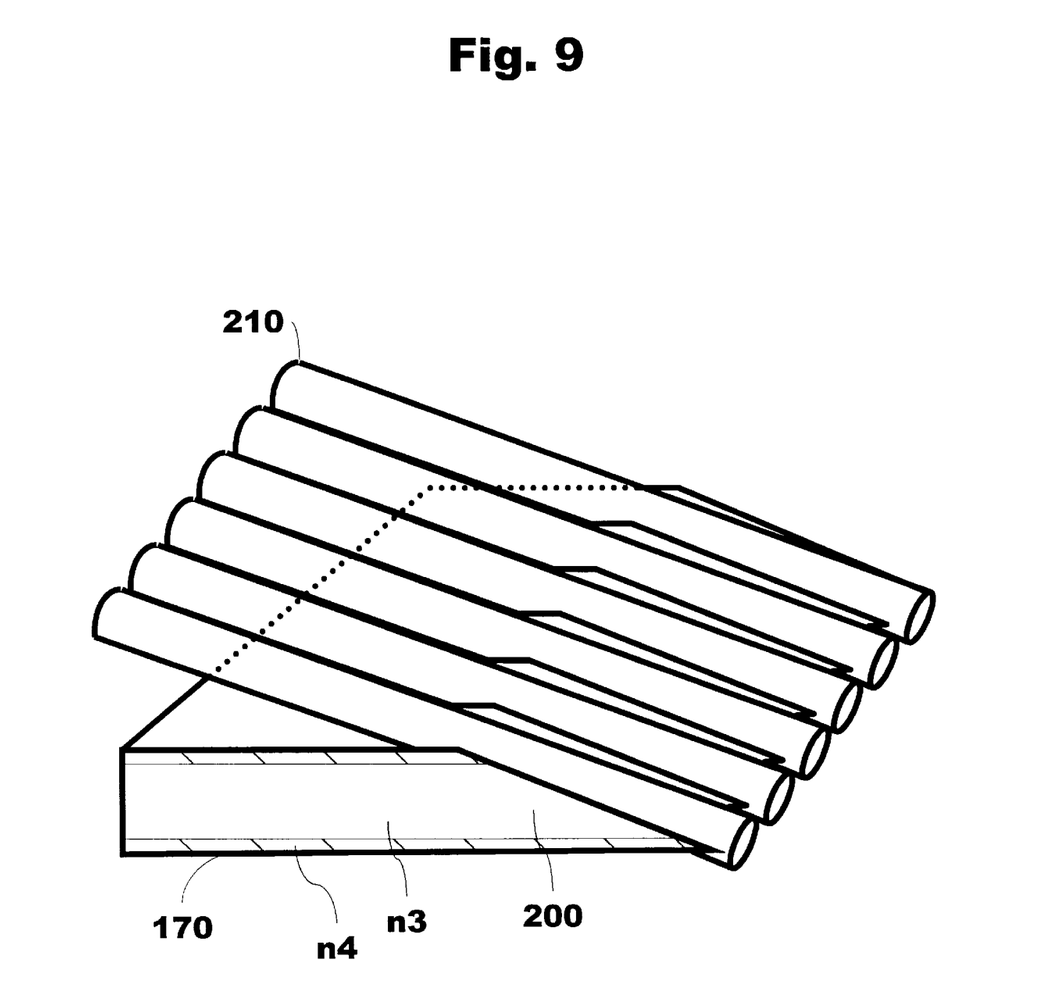
FIG. 9 shows how pickup fibers engage a part of the light guide.

FIG. 9 shows ends 210 of pickup fibers PF engaged by light guide 170 at tapered portion 200. The pickup fiber ends 210 engage the tapered portion 200 at the already-mentioned angle of inclination a. FIG. 9 again shows that the coating of the light guide 170 has a refractive index of n4, and that the material making up the light guide 170 has a refractive index of n3. Refractive index n3>n4.

Figure 10A:
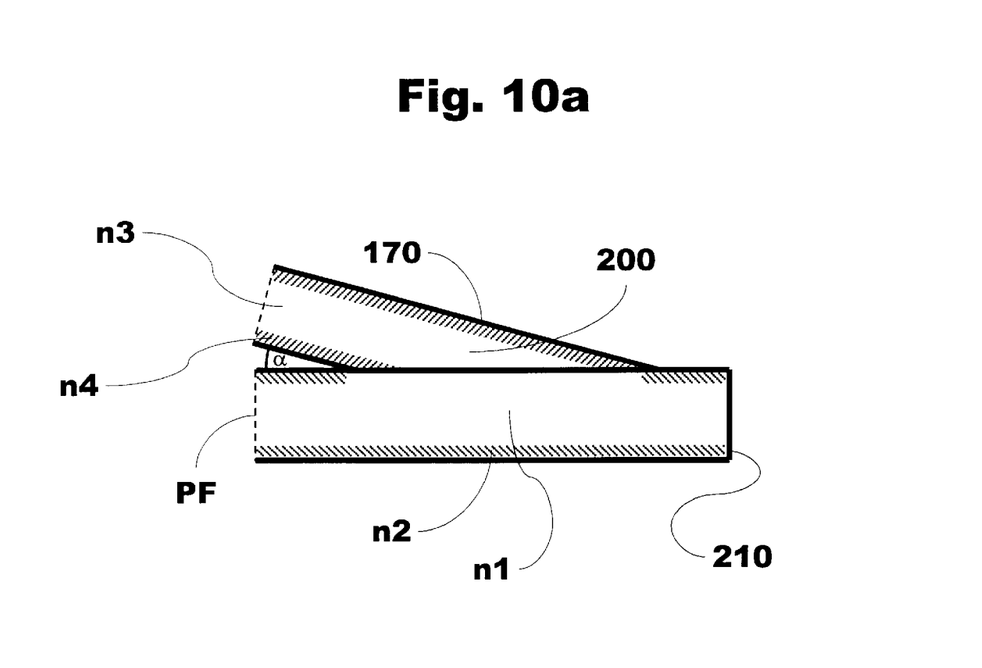
FIG. 10a shows a detail view of a single pickup fiber engaged by a part of the light guide.
Figure 10B:
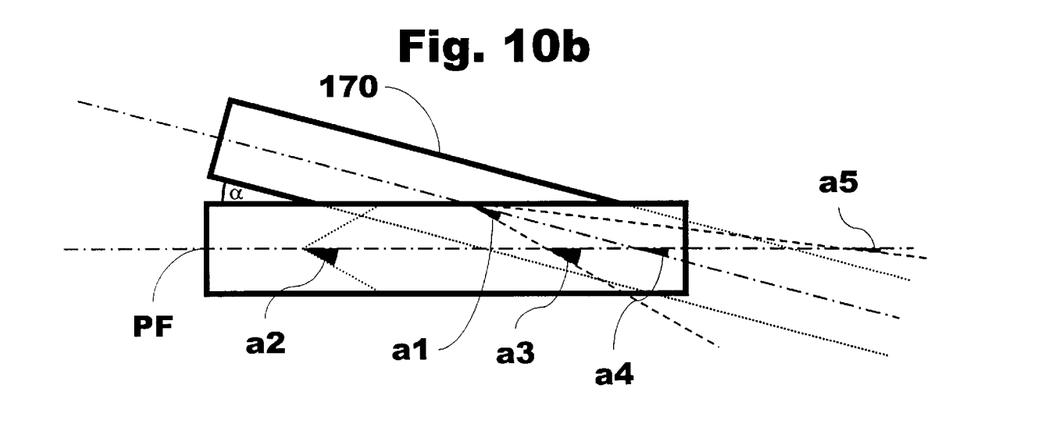
FIG. 10b shows a detail view similar to that of 10a but annotated to facilitate explanation of how light enters a pickup fiber from the light guide.

In FIGS. 10a and 10b, a part of a single pickup fiber end 210 is shown engaged by a part of the light guide 170 at tapered portion 200. Some parts are omitted for enhanced clarity. The area where the light guide 170 engages a pickup fiber PF may be referred to as a coupling area. The refractive indices n3 and n4 already have been discussed. The pickup fibers PF each are constructed so as to be generally made up of a material having a refractive index of n1, but are coated with a material having a refractive index of n2. In other words, the pickup fibers each have a cladding layer with refractive index n2. FIG. 10b is substantially similar to FIG. 10a, except that the cladding layer of the pickup fiber PF and the cladding layer of the light guide 170 are not illustrated.

Now a description will be given of the manner in which the light from the light guide 170 enters the pickup fiber PF through the coupling area. This description will be made with respect to a single preferred embodiment of the invention, but the specificities are meant for instruction only, and are not intended to limit the invention to the precise values given.

In FIGS. 10a and 10b, the PF (including its end 210) is a plastic optical fiber, CK-5 from MITSUBISHI, with a profile of n1 and n2. The core of the fiber is a high transparency Poly-methylmethacrylate and has a refractive index n1=1.492. The cladding of the fiber is made of a high transparency fluoropolymer, and has a refractive index n2=1.402. The numerical aperture NA of the fiber CK-5 is 0.51. The attenuation of this type of fiber is 0.18 dB/m. The diameter of the core of CK-5 is 107 micrometers, and the diameter of the core with the cladding layer is 114 micrometers.

This type of PF is particularly advantageous because of its relatively thin cladding layer. To remove the cladding layer from the end of the PF, it is sufficient to dissolve the layer with acetone, for example.

The light guide 170 has a core index of n3, and is made of acrylic material. The refractive index n3 of the core material of the light guide 170 is n3=n1=1.492. The light guide 170 is coated with a cladding layer made of OG-125 from EPOXY TECHNOLOGIES. The light guide 170 may be produced using injection molding to provide the proper shape. The coupling area of the light guide 170 may be masked during the coating of the cladding layer. The cladding layer may be coated on at a thickness of about 50 to 150 microns. The refractive index n4 of the cladding of the light guide 170 is n4=1.460. Thus, the following relationship exists: n1=n3>n4>n2.

FIG. 10*b* is similar to FIG. 10*a*, but has been annotated to depict some of the geometry involved in the coupling area and to illustrate the following angles and relationships. The figure is not to scale, and certain elements have been simplified or omitted for the sake of clarity. In FIG. 10*b*:

A1 represents half of the maximum acceptable angle of the core of the light guide 170;

A2 represents half of the maximum acceptable angle of the core of the pickup fiber PF;

A3 shows a maximum resulting angle of a light ray entering the PF;

A4 is the angle between the axis of the light guide 170 and the axis of the pickup fiber PF, also mentioned above as the angle of inclination α;

A5 is the difference between angles A4 and A1.

In this exemplary embodiment, the values of angles A1–A5 are approximately 17.9°, 30°, 30°, 12.1°, and 5.8°, respectively.

For the pickup fiber, the relationship between the maximum acceptable angle (θmax) and the numerical aperture N.A. is defined as follows:

$$N.A._{PF} = \sqrt{n1^2 - n2^2} = \sin(\theta max_{PF}).$$

It follows that:

$$\theta max_{PF} = 2 \sin^{-1}(N.A._{PF}) = 2 \sin^{-1}(\sqrt{n1^2 - n2^2}).$$

Likewise, the relationship between the maximum acceptable angle and the numerical aperture is defined as follows for the light guide 170:

$$N.A._{LG} = \sqrt{n3^2 - n4^2} = \sin(\theta max_{LG}).$$

It follows that:

$$\theta max_{LG} = 2 \sin^{-1}(N.A._{LG}) = 2 \sin^{-1}(\sqrt{n3^2 - n4^2}).$$

It is desirable to deliver the colored illumination light uniformly into the end of the is pickup fiber PF. The light ray has a smaller angle in the vertical direction when it is travelling inside the light guide 170 than in the pickup fiber PF because the numerical aperture $N.A._{LG}$ of the light guide 170 is less than the numerical aperture $N.A._{PF}$ of the pickup fiber PF. Angles A1 and A2 are derived using the formulas above.

To obtain the best coupling efficiency, it is preferred to remove the cladding layer of the pickup fiber PF at the coupling area, and to maintain the following relations:

$$A3 < A4 + A1$$

$$n1 = n3$$

$$n2 < n4$$

Since n1=n3, and since the cladding of the pickup fiber is removed in the coupling area, there is no change in the angle of a light ray (i.e., no Snell's law effect) due to the light ray passing from the light guide 170 to the pickup fiber PF (assuming there is no gap at the coupling). In general, the smaller the numerical aperture $NA_{LG}$ of the light guide 170, the larger that the coupling angle a will be and the angle A3 will be.

The largest angle of a light ray traveling inside the fiber should be equal to the critical angle of Snell's law or the total reflective angle of the fiber (A3). Therefore, when the ray comes out from the light guide 170 with a launch angle of A1 and merges with the pickup fiber at the coupling angle of A4, it will have the resulting angle of A3. If the angle A3 is still smaller than the half maximum acceptable angle of the pickup fiber A2, then the ray coming from the light guide will launch into the PF and remain within the conditions for total internal reflection (TIR) for the PF.

Most of the reflected light containing the picked-up image information will travel back through the PF to the O/E module. A very small amount will, however, go back into the light guide 170 and be returned to the light source through the illumination fibers. The pickup and illumination fibers in fiber bundle 50 are therefore substantially uni-directional. The pickup fibers are bi-directional at only the part beyond the coupling area. Between the O/E module and the coupling area, the pickup fibers are uni-directional. The illumination fibers are substantially uni-directional. The illumination fibers carry RGB light to the light guide 170, but a very small amount of sensed light may re-enter the light guide 170 at the coupling area. The amount is small, however. Thus, the pickup fibers and the illumination fibers in fiber bundle 50 may be referred to as being uni-directional.

Figure 11:
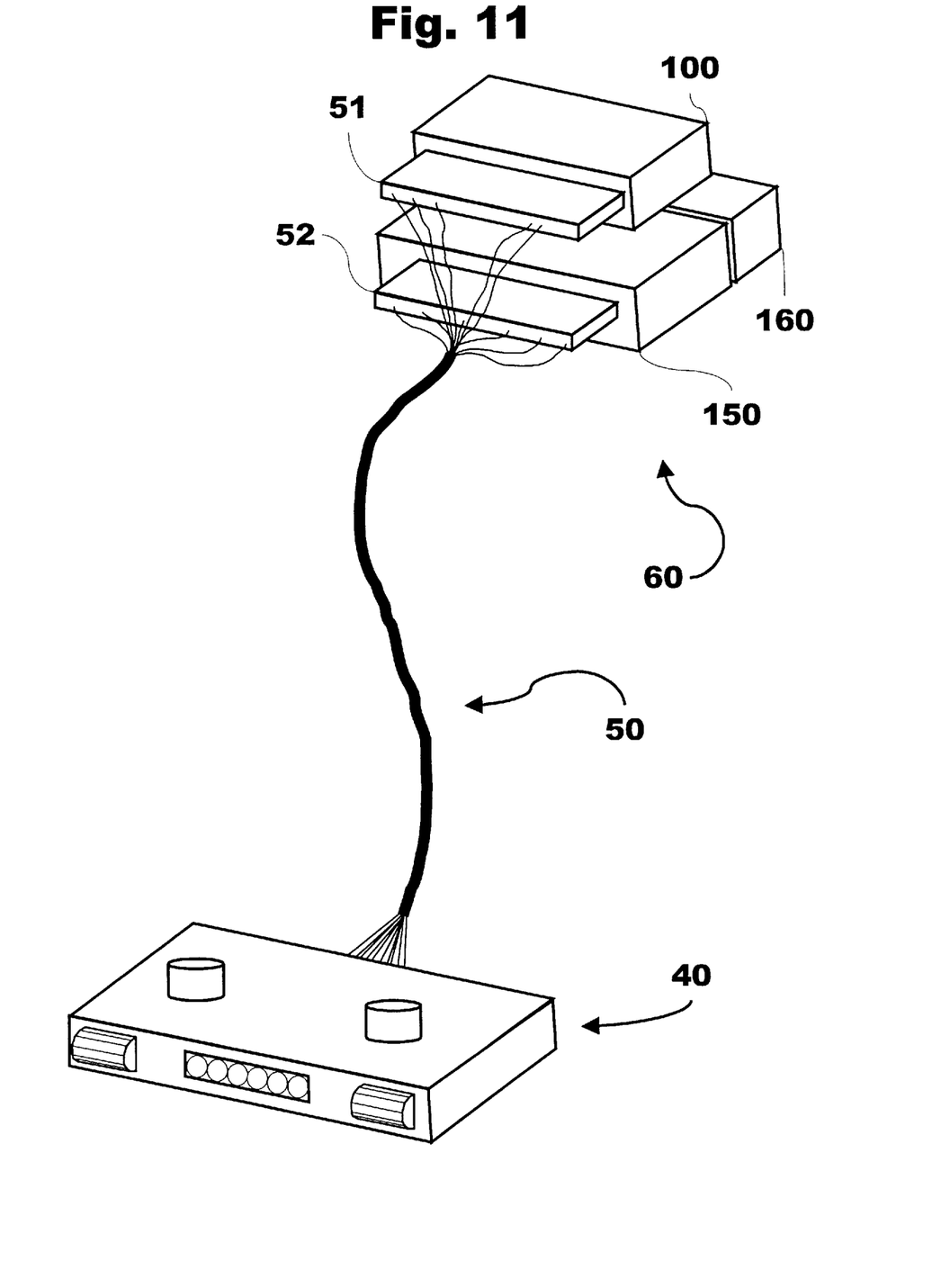
FIG. 11 shows a perspective view of a preferred embodiment of the invention.

FIG. 11 shows a presently preferred embodiment of the invention. In FIG. 11, CCD array 160 is operably disposed next to receptacle 150. Together, CCD array 160 and receptacle 150 make up CCD unit 90 (see FIGS. 2 and 4*a*). The CCD array 160 may have a linear or a 2-dimensional arrangement of sensors (see FIGS. 4*b* and 4*c*). Inserted into receptacle 150 is connector 52 (see FIG. 5). Connector 52 has just the pickup fibers. The pickup fibers extend from connector 52, through fiber bundle 50, to scanning head 40, and can be seen as six fiber ends on the scanning face of scanning head 40, flanked by rollers. Light source 100 has a receptacle adapted to accommodate connector 51. Connector 51 has the illumination fibers and the control fibers (see FIG. 5). The pickup fibers extend from connector 51, through fiber bundle 50, to scanning head 40, and connect with the light guide 170 inside the scanning head 40 (see FIG. 6). The light guide 170 is inside scanning head 40, and is not visible in FIG. 11. The light source 100 may include separate LEDs for each color light, or may include LEDs that produce light in three colors (see FIGS. 3*a* and 3*b*). The fiber bundle 50 is incoherent, and the method of driving the scanner is described in application Ser. No. 09/124,832.

Useful modifications to the invention as shown in FIG. 11 include making the connectors 51 and 52 into only one connector; separating connector 51 into two or more connectors; or doing away with the connectors altogether and wiring the fibers directly into the O/E module 60. Similarly, connectors may be added between the scanning head 40 and the fiber bundle 50. The scanning head 40 may be made into different shapes for decorative or ergonomic reasons.

In the illustrations, only six pickup fibers, only three illumination fibers, and only two control fibers are shown. This is for the purpose of simplified illustration only, and it will be understood that the actual number of fibers used is not critical to the invention. Indeed, it is recommended that many more pickup fibers be used so as to provide a scanning width that is convenient for the end user.

To review, the scanning head 40 has a light guide 170 that receives RGB illumination light from the light source 100 via the illumination fibers of fiber bundle 50. The tapered portion 200 of the light guide 170 passes the RGB light to the pickup fiber ends 210 at the coupling area of each pickup fiber PF (i.e., where the tapered portion 200 engages the pickup fiber end 210). This arrangement permits the illumination light to enter the side of the pickup fiber near the end. The illumination light goes out the pickup fiber ends and reflects off of target 30. The light reflected back into the pickup fiber ends 210, known as sensed light, or reflected light, is guided through the pickup fibers of fiber bundle 50 to CCD array 160 of CCD unit 90.

By virtue of the light guide 170, RGB illumination light can be made to enter the pickup fiber ends 210 so as to become sensed light. The direct coupling of an illumination fiber to a pickup fiber is not required, because the light guide performs this function at the coupling area. Because illumination fibers do not need to be coupled to pickup fibers, there is no requirement to notch the pickup fibers as is the case in the side-coupling approach of the all-optical scanner described in the above-mentioned related application. Thus, all of the advantages of an all-optical scanner are achieved but the shortcoming of having to notch optical fibers is overcome.

Because it is not necessary to notch the pickup fibers, a difficult manufacturing step is avoided.

We claim:

1. A scanner, comprising:

an optical-electric module;

an incoherent fiber bundle; and a light guide;

said fiber bundle including illumination fibers carrying illumination light from said optical-electric module to said light guide, and pickup fibers carrying sensed light from a scanner head to said optical-electrical module;

said light guide outputting said illumination light to one of said pickup fibers at a coupling area; and said illumination and pickup fibers being substantially uni-directional between said optical-electric module and said coupling area.

2. The scanner as set forth in claim 1, further comprising said scanner head enclosing said coupling area.

3. The scanner as set forth in claim 2, further comprising said scanner head being free of electronic components.

4. The scanner as set forth in claim 3, further comprising:

said pickup fibers having a core refractive index of n1 and a cladding refractive index of n2;

said light guide having a core refractive index of n3 and a cladding refractive index of n4;

wherein n1=n3>n4>n2.

5. The scanner as set forth in claim 4, further comprising:

said light guide coupling to said pickup fibers at said coupling area with a coupling angle;

said pickup fibers being free from said cladding layer in said coupling area; and said illumination light coming from said light guide having a launch angle which, when merged with one of said pickup fibers at said coupling angle, has a resulting angle that is less than or equal to half of a maximum acceptable angle of said pickup fiber.

* * * * *

UNITED STATES PATENT AND TRADEMARK OFFICE
CERTIFICATE OF CORRECTION

PATENT NO.   : 6,157,027
DATED        : December 5, 2000
INVENTOR(S)  : Wantanabe, Kojiro, Wang and Ting

It is certified that error appears in the above-identified patent and that said Letters Patent is hereby corrected as shown below:

Column 5,
Line 50, delete "So" insert -- 50 --.

Column 7,
Line 49, delete "$\sqrt{n1^2 {-} n22}$" insert -- $\sqrt{_n1^2 {-}_n2^2}$ --;
Line 61, delete "is"

Signed and Sealed this

Ninth Day of April, 2002

Attest:

Attesting Officer

JAMES E. ROGAN
Director of the United States Patent and Trademark Office